United States Patent [19]

Berglund

[11] Patent Number: 6,094,567
[45] Date of Patent: Jul. 25, 2000

[54] TEMPERATURE CONTROL SAFETY MECHANISM FOR RADIO BASE STATIONS

[75] Inventor: Bo Berglund, Stockholm, Sweden

[73] Assignee: Telefonaktiebolaget LM Ericsson, Stockholm, Sweden

[21] Appl. No.: 08/997,233

[22] Filed: Dec. 23, 1997

[51] Int. Cl.$^7$ .............................. H03C 1/62; H04Q 7/20
[52] U.S. Cl. ..................... 455/115; 455/117; 455/424; 455/561
[58] Field of Search ...................... 455/343, 424, 455/67.1, 561, 423, 117, 115, 8, 127, 231, 217; 361/93.8, 103, 104, 105, 156; 62/126; 236/51; 307/52, 57, 59, 86, 87

[56] References Cited

U.S. PATENT DOCUMENTS

| | | | |
|---|---|---|---|
| 4,174,064 | 11/1979 | Pratt, Jr. ......................................... | 236/1 |
| 4,284,126 | 8/1981 | Dawson .................................. | 165/11.1 |
| 4,870,698 | 9/1989 | Katsuyama et al. ....................... | 455/67 |
| 5,410,740 | 4/1995 | Hagström ............................... | 455/67.1 |
| 5,436,513 | 7/1995 | Kaye et al. ............................... | 307/71 |
| 5,462,226 | 10/1995 | Massara et al. ........................... | 236/47 |
| 5,487,185 | 1/1996 | Halonen .................................. | 455/127 |
| 5,492,082 | 2/1996 | Krevinghaus et al. .................. | 119/448 |
| 5,519,886 | 5/1996 | Gilbert et al. ........................... | 455/115 |
| 5,648,962 | 7/1997 | Pirinen ..................................... | 370/338 |
| 5,712,779 | 1/1998 | Sheppard et al. ........................ | 363/69 |

FOREIGN PATENT DOCUMENTS 5-292002  11/1993  Japan .
5-308418  11/1993  Japan .

OTHER PUBLICATIONS

European Standard Search Report re RS 100525 Date of completion of search: Sep. 3, 1998.

*Primary Examiner*—Reinhard J. Eisenzopf
*Assistant Examiner*—Charles N. Appiah
*Attorney, Agent, or Firm*—Burns, Doane, Swecker & Mathis, L.L.P.

[57] ABSTRACT

A method and apparatus for reducing the amount of heat generated by a base station is disclosed. The method includes measuring the temperature of the base station equipment with a temperature sensor. When the sensor detects that a first predefined temperature level is reached, a first alarm in the mobile switching center is triggered. In response, the mobile switching center blocks a first predefined number of transceivers. Similarly, if the temperature continues to rise past a second and third predefined temperature levels, the mobile switching center blocks a second and third respective predefined number of transceivers as necessary. As the temperature decreases, the mobile switching center unblocks the respective transceivers in reverse order as determined by the temperature. The technique reduces the operating temperature of the base station such that equipment failure due to excessive heat is prevented.

16 Claims, 1 Drawing Sheet

12

TEMPERATURE CONTROL SAFETY MECHANISM FOR RADIO BASE STATIONS

FIELD OF THE INVENTION

The present invention relates generally to the operating temperature environment for radio base stations. More specifically, the invention relates to a method of preventing operational failure due to the overheating of base station equipment.

BACKGROUND OF THE INVENTION

In a wireless telecommunications network, radio base stations are in radio communication with mobile terminals within their predefined coverage area or cell. Consequently, the continued operation of base stations are essential for providing mobile terminals access to the telecommunications network. For this reason, it is desirable for base stations to remain operational in spite of the many types of problems that may occur. For example, when considering power failures, having a backup power source becomes an important consideration when installing the infrastructure for the base stations.

Suitable exemplary backup power sources may include batteries, which are typically bulky and costly, or diesel electric generators. These backup power sources provide replacement power whenever the primary power source fails.

A factor that can significantly impact the ability of base stations to function is the operating temperature of the equipment. Therefore, many installation sites incorporate carefully controlled temperature environments in order to prevent equipment failure due to overheating. The type of cooling methods employed at these sites may ranges from using air conditioned rooms to elaborate heat removal devices such as water tanks, to simple air ventilation. But there are problems associated with many of these cooling solutions. For example, the high expense of obtaining backup power for radio base stations results in the lack of provisioning power to the air conditioning unit while operating in backup mode. To illustrate the amounts of power necessary, a typical three sectored base station site having 24 transceivers per sector transmitting at 30 watts requires approximately 11.9 kilowatts of power. What's more, a similar amount heat dissipation is required thereby placing more importance on cooling means. Since many backup systems are required to power base stations for at least 2–4 hours or more, extraneous power consuming equipment such as air conditioners are often sacrificed. Without cooling means, a base station would rapidly generate excessive heat to levels that may lead to equipment failure.

In an effort to reduce costs, some base stations are housed in simple low cost shelters. These shelters are relatively small and austere structures that provide little more than basic protection from the environment. Shelters and also small equipment rooms will cause a very fast increase of the temperature due to the small volume. As a further example, the disadvantage of the water tank method is that it tends to be expensive and space intensive. Also, the use of simple air ventilation is not adequate since they typically only work efficiently with relatively cool outside temperatures.

In view of the foregoing, it is an objective of the present invention to provide a method of maintaining base station operations by controlling the excessive heat generated by the base station equipment.

SUMMARY OF THE INVENTION

Briefly described, and in accordance with embodiment thereof, the invention discloses a method and apparatus for controlling the amount of heat generated by heat emitting components within the base station. The method includes measuring the temperature of the heat generating components e.g. the transceivers with a temperature sensor. The temperature sensor is configured to signal the mobile switching center to trigger an alarm when a first predefined temperature is reached. In response, the mobile switching center blocks a first predefined number of transceivers in the base station. Likewise, when a second and third predefined temperatures are reached, the mobile switching center blocks a second and third predefined number of transceivers respectively as needed in an effort to reduce the operating temperature. As the temperature decreases, the mobile switching center unblocks the respective transceivers in reverse order as determined by the temperature.

The present invention provides a method of reducing the amount of heat generated by the base station such that equipment failure due to excessive heat is prevented. The method allows for the base station to function with reduced capacity even at very high operation temperatures or with a cooling systems failure. The ability to regulate excessive operating temperatures will prevent the reduction of the mean time between failure (MTBP) rates. Furthermore, the technique is simple to install requiring only relatively minor modifications to existing software. These and other advantages of the present invention will become apparent upon reading the following detailed descriptions and studying the various figures of the drawings.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

In a basic cellular telecommunication system, a mobile switching center (MSC) is linked to a plurality of base stations by a series of digital transmission links. The base stations are geographically dispersed to form an area of coverage for the system. Each base station (BS) is designated to cover a specified area, known as a cell, in which two way radio communication can take place between a mobile terminal (MT) 8 and the BS in the associated cell. A description of a temperature regulation system operating in accordance with the present invention follows.

Figure 1:
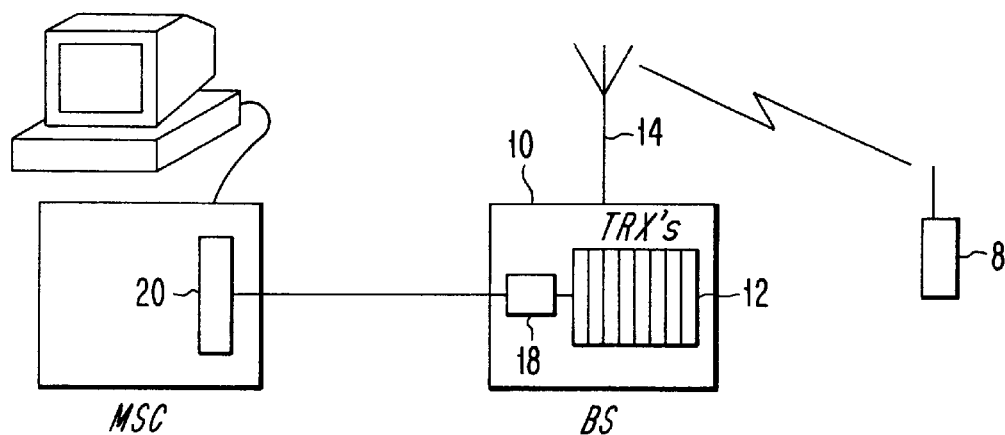
FIG. 1 illustrates a simplified block diagram of a temperature regulation system operating in accordance with an embodiment of the present invention.

FIG. 1 illustrates a simplified block diagram of a wireless system operating in accordance with an embodiment of the present invention. A base station (BS) 10 comprises of a number of heat generating components that are enclosed within the base station structure. For example, components such as transceivers 12 and amplifiers not shown generate substantial amounts of heat during normal operation. Such heat generation can lead to excessive temperatures that may lead to equipment failure if provisions are not taken to dissipate the heat. Since a typical operating efficiency for a base station is less than 10% the majority of the power is emitted as heat which must be dissipated. As an example, a typical 72 transceiver base station operating at 50 watts requires approximately 21 kilowatts of power to operate. Of that only 1.8 kilowatts is transmitted via antenna 14 and some 19.8 kilowatts is emitted as heat through the various components.

In accordance with the embodiment, the temperature is continually monitored in an effort to prevent catastrophic equipment failure due to overheating. This is, accomplished by placing a temperature sensor 18 within the base station in the region of the heat generating components i.e. the transceivers or signal amplifiers. Temperature sensor 18, which may represent multiple independent temperature sensors, is configured to react in response to a specified temperature level. Sensor 18 detects when the temperature level of the heat generating components reach four specific predefined levels in a stepped-wise fashion. As an example, when the temperature reaches a first predefined temperature e.g. 35° C., sensor 18 generates signal to trigger a first alarm in the MSC to alert it of this event. The generated signal is sent to the MSC via an existing digital communication link coupling the BS with the MSC. At the MSC there typically exists an alarm panel 20 consisting of an array of alarms (approximately 32) configured to notify the MSC of various specific problems that may be encountered within the wireless network. The alarms that are monitored may be presented on a display to notify the operator of any triggered alarms. After receiving the alarm signifying the first predefined temperature level has been reached, the MSC responds by blocking (taking off-line) a predefined number of transceivers e.g. 25 percent in order to reduce the heat emissions.

If the temperature continues to increase to a second predefined level of e.g. 40° C., sensor 18 triggers a second alarm in panel 20 to initiate the blocking of an additional 25 percent of transceivers. Similarly, when the temperature level of 45° C. is reached in the base station, still 25 percent more transceivers are blocked for a total of 75 percent. The MSC can be programmed to maintain e.g. 10 percent of the transceivers to be operational for emergency traffic even if the temperature climbs above the highest level. The stepped reduction in transceiver operations permits a controlled react ion to generated heat thereby reducing the likelihood of reaching the critical temperatures that can cause catastrophic equipment failure.

Figure 2:
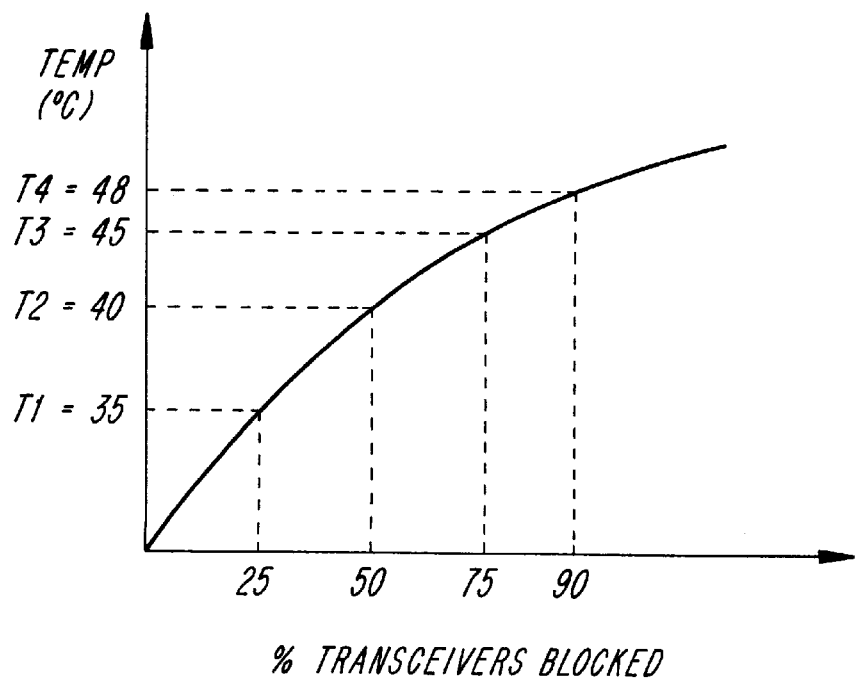
FIG. 2 shows a graph of an exemplar proportion of transceivers blocked versus temperature.

FIG. 2 shows a graph of an exemplary proportion of blocked transceivers versus temperature in accordance with the embodiment described. It should be understood that the triggering temperatures and the percentages of blocked transceivers are merely exemplary and that other values may be chosen that are better suited for a particular base station and type of cooling equipment available. In addition, a technique for blocking devices is further described in U.S. Pat. No. 5,410,740 granted to Ulf E. Hagström entitled: Control of a Radio Communications System Base Station, issued on Apr. 25, 1995 to the present assignee and is incorporated by reference herein in its entirety.

As the temperature decreases in response to the blocking action, a reverse blocking procedure occurs to bring transceivers back into operation as expeditiously as possible. For example, when sensor 18 detects when the temperatures fall below each preset temperature level, the respective alarm is reset in the alarm panel 20 and the MSC will unblock the same respective transceivers in reverse order. The unblocking action is desirable since it restores capacity back to operators so that revenue can be generated.

The present invention contemplates a method for controlling excessive heat generation in base station equipment. The method allows for a gradual reduction of operations in order to prevent the components from burning out and becoming unusable. The method requires only relatively minor modifications to existing base stations and MSC software.

While the invention has been described with reference to a specific embodiment, the description is illustrative of the invention and is not to be construed as limiting to the invention. In particular, the number of temperature levels, specific temperatures, and transceiver blocking assignments may be varied to suit specific base station environments. Further, it is possible to reduce heat generation in base stations by means other than simply blocking transceivers, for example, by reducing the transmission output power of transceivers. Therefore, various modifications and applications may occur to those skilled in the art without departing from the true spirit and scope of the invention as defined by the appended claims.

What is claimed is:

1. In a wireless telecommunication system having a mobile switching center and at least one base station, and wherein said base station including a plurality of heat generating components including transceivers, a method comprising the steps of:

measuring the temperature in said base station;

signaling the mobile switching center when said measured temperature reaches a first predefined level;

blocking a first predefined number of said transceivers in said base station;

signaling the mobile switching center when said measured temperature reaches a second predefined level; and blocking a second predefined number of transceivers in said base station.

2. A method according to claim 1, still further comprises the step of signaling the mobile switching center to block a third predefined number of transceivers in response to said measured temperature reaching a third predefined level.

3. A method according to claim 2 wherein said third predefined temperature level is 45° C. and said third predefined number of transceivers is 75 percent.

4. A method according to claim 2 wherein a minimum of 10 percent of transceivers remains unblocked by the mobile switching center even after reaching a maximum measured temperature.

5. A method according to claim 1 wherein said measuring step is performed by at least one temperature sensor located near the heat generating components.

6. A method according to claim 1 wherein said signaling the mobile switching center step includes triggering an alarm in the mobile switching center which is presented for display to an operator.

7. A method according to claim 1 wherein said first predefined temperature level is 35° C. and said first predefined number of transceivers is 25 percent.

8. A method according to claim 1, wherein said second predefined temperature level is 40° C. and said second predefined number of transceivers is 50 percent.

9. A method according to claim 1 wherein the respective transceivers are unblocked in reverse order when the temperature decreases.

10. In a wireless telecommunication system having a mobile switching center and at least one base station, and wherein said base station including a plurality of heat generating components including transceivers, an apparatus comprising:

means for measuring the temperature in said base station;

means for signaling the mobile switching center when a first predefined temperature level is measured;

means for blocking a first predefined number of said transceivers in said base station;

means for signaling the mobile switching center when a second predefined temperature level is measured; and means for blocking a second predefined number of transceivers.

11. The apparatus of claim 10 wherein said measuring means includes a plurality of temperature sensors.

12. The apparatus of claim 10 wherein said means for blocking the transceivers is performed by the software in the mobile switching center.

13. The apparatus of claim 10, further comprising:

means for signaling the mobile switching center when a third predefined temperature level is reached; and means for blocking a third number of transceivers responsive to said signaling.

14. The apparatus of claim 13, wherein said third predefined temperature level is 45° C. and said third predefined number of transceivers is 75%.

15. The apparatus of claim 10, wherein said first predefined temperature level is 35° C. and said first predefined number of transceivers is 25%.

16. The apparatus of claim 10, wherein said second predefined temperature level is 40° C. and said second predefined number of transceivers is 50%.

* * * * *